US009487177B2

(12) United States Patent
Schneider et al.

(10) Patent No.: US 9,487,177 B2
(45) Date of Patent: Nov. 8, 2016

(54) AIRBAG ASSEMBLIES FOR VEHICLES WITH GENEROUS LEG ROOM

(71) Applicant: Autoliv ASP, Inc., Ogden, UT (US)

(72) Inventors: David W. Schneider, Waterford, MI (US); Richard Lawrence Matsu, Plymouth, MI (US); Donald James Paxton, Romeo, MI (US); Stephen Charles Camm, Port Huron, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/683,047

(22) Filed: Apr. 9, 2015

(65) Prior Publication Data

US 2016/0297392 A1    Oct. 13, 2016

(51) Int. Cl.
*B60R 21/231*    (2011.01)
*B60R 21/233*    (2006.01)
*B60R 21/055*    (2006.01)
*B60R 21/206*    (2011.01)

(52) U.S. Cl.
CPC .......... *B60R 21/231* (2013.01); *B60R 21/055* (2013.01); *B60R 21/206* (2013.01); *B60R 21/233* (2013.01); *B60R 2021/23107* (2013.01); *B60R 2021/23169* (2013.01)

(58) Field of Classification Search
CPC . B60R 21/231; B60R 21/206; B60R 21/233; B60R 21/055; B60R 2021/23169; B60R 2021/23107
See application file for complete search history.

(56) References Cited

U.S. PATENT DOCUMENTS

| 3,610,657 A | * | 10/1971 | Cole | B60R 21/233 280/729 |
| 3,767,225 A | * | 10/1973 | Mazelsky | B60R 21/206 137/850 |
| 3,768,830 A | * | 10/1973 | Hass | B60R 21/233 280/729 |
| 4,043,572 A | * | 8/1977 | Hattori | B60R 21/30 137/844 |
| 4,262,931 A | | 4/1981 | Strasser et al. | |
| 4,948,168 A | | 8/1990 | Adomeit et al. | |
| 5,344,184 A | | 9/1994 | Keeler et al. | |
| 5,470,103 A | | 11/1995 | Gridley et al. | |
| 5,513,877 A | * | 5/1996 | MacBrien | B60R 21/233 280/732 |

(Continued)

FOREIGN PATENT DOCUMENTS

| DE | 19841347 A1 | 3/2000 |
| DE | 19859988 A1 | 6/2000 |

(Continued)

OTHER PUBLICATIONS

International Search Report and Written Opinion for PCT/US2016/022069 mailed May 17, 2016.

*Primary Examiner* — Drew Brown
(74) *Attorney, Agent, or Firm* — Stoel Rives LLP

(57) ABSTRACT

Protection systems for vehicle occupants, such as airbag assemblies, can be deployed from within a vehicle. Such airbag assemblies can include a frontal airbag cushion and a knee restraint to absorb an occupant's impact energy during a collision event. Such protection systems can be particularly useful in vehicles that provide generous leg room to an occupant.

20 Claims, 8 Drawing Sheets

(56) References Cited

U.S. PATENT DOCUMENTS

| | | | |
|---|---|---|---|
| 5,536,043 A | 7/1996 | Lang et al. | |
| 5,775,729 A * | 7/1998 | Schneider | B60R 21/2171 |
| | | | 280/728.2 |
| 5,971,431 A | 10/1999 | Wohllebe et al. | |
| 6,039,380 A | 3/2000 | Heilig et al. | |
| 6,237,938 B1 | 5/2001 | Boxey | |
| 6,631,920 B1 * | 10/2003 | Webber | B60R 21/206 |
| | | | 280/730.1 |
| 6,637,769 B2 | 10/2003 | Peer et al. | |
| 6,733,035 B2 | 5/2004 | Thomas et al. | |
| 7,540,531 B2 | 6/2009 | Sakakibara et al. | |
| 7,661,701 B2 | 2/2010 | Hirata | |
| 7,758,069 B2 * | 7/2010 | Enders | B60R 21/01 |
| | | | 280/730.1 |
| 7,762,579 B2 | 7/2010 | Garner | |
| 8,181,990 B2 * | 5/2012 | Maripudi | B60R 21/233 |
| | | | 280/732 |
| 8,235,418 B2 | 8/2012 | Slaats et al. | |
| 8,414,022 B2 * | 4/2013 | Song | B60R 21/205 |
| | | | 280/729 |
| 8,602,448 B2 | 12/2013 | Choi et al. | |
| 2002/0024200 A1 * | 2/2002 | Eckert | B60R 21/232 |
| | | | 280/730.1 |
| 2003/0001372 A1 | 1/2003 | Browne et al. | |
| 2003/0015861 A1 * | 1/2003 | Abe | B60R 21/231 |
| | | | 280/730.1 |
| 2003/0030254 A1 * | 2/2003 | Hasebe | B60R 21/233 |
| | | | 280/729 |
| 2003/0052476 A1 | 3/2003 | Rose | |
| 2003/0100983 A1 | 5/2003 | Bullinger et al. | |
| 2004/0090050 A1 | 5/2004 | Dominissini | |
| 2004/0100080 A1 * | 5/2004 | DePue | B60R 21/231 |
| | | | 280/743.1 |
| 2004/0174003 A1 | 9/2004 | Dominissini | |
| 2004/0183282 A1 | 9/2004 | Schneider et al. | |
| 2004/0188991 A1 | 9/2004 | Schneider et al. | |
| 2004/0239082 A1 | 12/2004 | Schneider et al. | |
| 2004/0251668 A1 | 12/2004 | Schneider et al. | |
| 2005/0001412 A1 | 1/2005 | Schneider et al. | |
| 2005/0040627 A1 | 2/2005 | Depottey et al. | |
| 2005/0040667 A1 | 2/2005 | Schneider et al. | |
| 2005/0062262 A1 | 3/2005 | Williams | |
| 2005/0070414 A1 | 3/2005 | Schneider et al. | |
| 2005/0073135 A1 | 4/2005 | Choi | |
| 2005/0218632 A1 | 10/2005 | Cuevas et al. | |
| 2007/0210565 A1 * | 9/2007 | Song | B60R 21/206 |
| | | | 280/732 |
| 2010/0066064 A1 * | 3/2010 | Kotikovsky | B60R 7/06 |
| | | | 280/728.3 |
| 2011/0285114 A1 * | 11/2011 | Ohara | B60R 21/206 |
| | | | 280/730.1 |
| 2015/0151707 A1 * | 6/2015 | Chen | B60R 21/233 |
| | | | 280/730.1 |

FOREIGN PATENT DOCUMENTS

| | | |
|---|---|---|
| DE | 10115064 A1 | 11/2002 |
| EP | 1541426 A1 | 6/2005 |
| EP | 1757494 A2 | 2/2007 |
| GB | 2345669 A | 7/2000 |
| GB | 2364674 A | 2/2002 |
| GB | 2378424 A | 2/2003 |
| GB | 2388080 A | 11/2003 |
| GB | 2388081 A | 11/2003 |
| JP | 2005096653 A | 4/2005 |
| JP | 2006188206 A | 7/2006 |
| JP | 3915348 B2 | 5/2007 |
| JP | 5229238 B2 | 7/2013 |
| KR | 20100039085 A | 4/2010 |
| KR | 20150027587 A | 3/2015 |
| WO | WO0041919 A1 | 7/2000 |
| WO | WO2008054266 A1 | 5/2008 |
| WO | WO2009102791 A1 | 8/2009 |
| WO | WO2010128762 A2 | 11/2010 |

* cited by examiner

AIRBAG ASSEMBLIES FOR VEHICLES WITH GENEROUS LEG ROOM

TECHNICAL FIELD

The present disclosure relates generally to the field of protection systems for vehicle occupants. More particularly, the present disclosure relates to airbag assemblies and other protection systems that are configured to cushion the knee and/or lower leg of an occupant during a collision event. Some airbag assemblies disclosed herein are suitable for use in vehicles that provide generous leg room to an occupant.

BACKGROUND

Protection systems have been installed in vehicles to protect an occupant during a collision event. Some protection systems suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
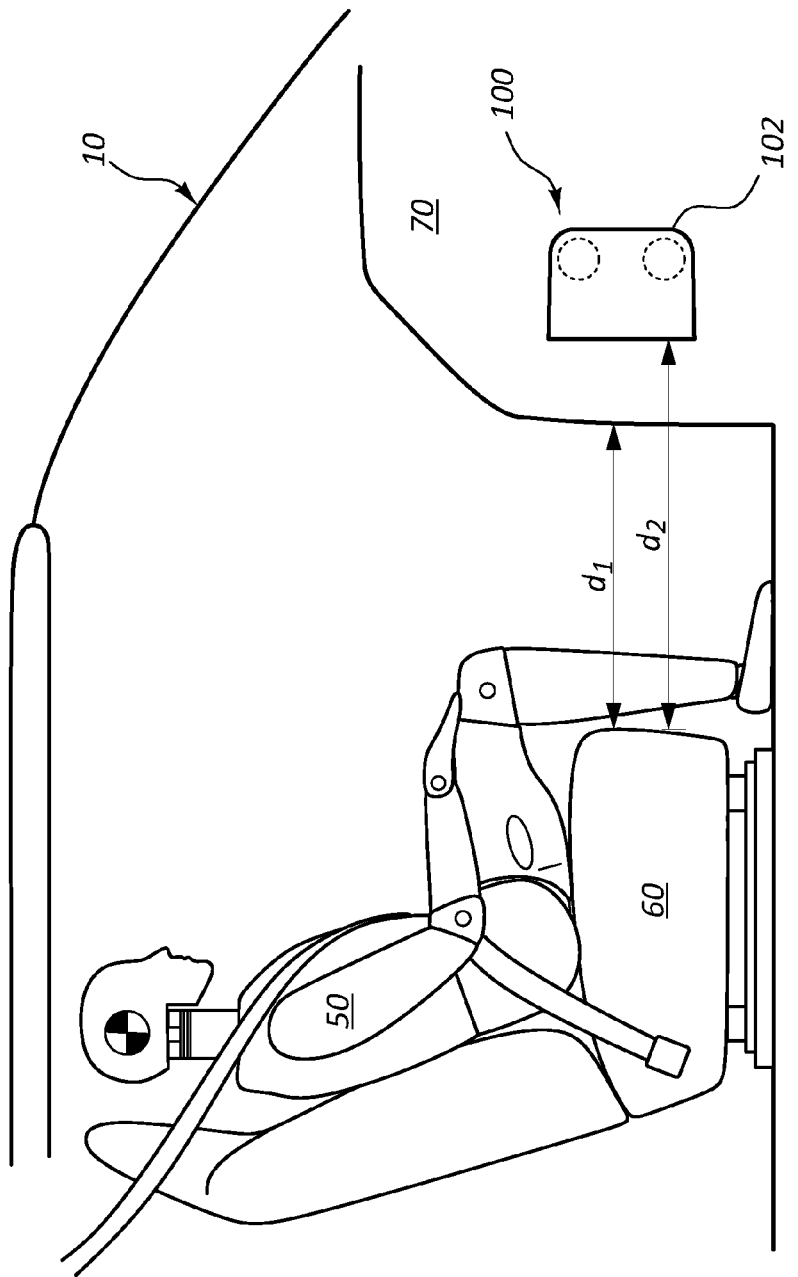
FIG. 1 is a side view of an airbag assembly, according to one embodiment, prior to deployment.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrase "coupled to" is used in its ordinary sense, and is broad enough to refer to any suitable coupling or other form of interaction between two or more entities, including mechanical, fluid, and thermal interaction. Two components may be coupled to each other even though they are not in direct contact with each other. The phrase "attached to" refers to interaction between two or more entities which are in direct contact with each other and/or are separated from each other only by a fastener of any suitable variety (e.g., mounting hardware or an adhesive). For the sake of clarity, an airbag cushion that shares a portion of a panel with another airbag cushion is "attached" to that airbag cushion.

As used herein, the terms "forward" and "rearward" are used with reference to the front and back of the relevant vehicle. For example, an airbag cushion that deploys in a rearward direction deploys toward the back of the vehicle. The term "frontal airbag," as used herein, refers to an airbag cushion that is configured to cushion the head and/or torso of an occupant as the occupant moves in a primarily forward direction during a collision event, regardless of whether the occupant is seated in a front seat of the vehicle.

As used herein, an "upper" or "lower" surface of an airbag cushion refers to an upper or lower surface of the airbag cushion when the airbag cushion is in an inflated state. The term "reaction surface," as used herein, refers to a surface disposed generally forward of an inflated airbag cushion that interacts with the airbag cushion to restrict the forward movement and/or forward rotation of an airbag cushion upon occupant loading. The term "occupant" refers to a person or crash test dummy within a vehicle. The term "knee restraint" refers to knee airbags and knee bolsters that are configured to cushion one or more knees of an occupant during a collision event. As used herein, the term "vehicle occupant position" refers to a position typically occupied by an occupant when seated in a seat of a vehicle. A vehicle occupant position may also be referred to as a "seating position," which refers to a position in which the vehicle is designed to have an occupant be positioned (e.g., seated) during operation.

Occupant protection systems may be installed at various locations within a vehicle to reduce or minimize occupant injury during a collision event. For example, such systems may be installed to cushion a front-seat passenger, a driver, or an occupant seated behind the front seat(s) of a vehicle. In the following disclosure, specific reference is made to occupant protection systems (e.g., airbag assemblies) that are designed to cushion a front-seat passenger, although the principles discussed herein may apply to automotive protective systems that are designed to cushion other occupants as well, such as the driver or occupants seated rearward of the front seat(s) of a vehicle. For instance, occupant protection systems may be installed in seats or other vehicle structures that are disposed forward of a back-seat occupant and operate in a manner analogous to that described in greater detail below in connection with protection systems for a front-seat passenger.

Some of the occupant protection systems disclosed herein may be particularly useful for protecting occupants that are seated in seats in a passenger compartment providing generous leg room. For example, in some embodiments disclosed herein, the distance from the instrument panel and the seat in which the occupant is seated is greater than or equal to 300, 350, 400, 500, 600, and/or 800 mm. In some embodiments, the distance between a housing disposed forward of the occupant and the seat in which the occupant is seated is greater than or equal to 350, 400, 500, 600 and/or 800 mm. The protection of occupants in such vehicles can present unique challenges due to the distance between the occupant's knees and the vehicle structure disposed directly forward of the occupant's knees. For occupants seated in a relatively cramped environment, a collision event often causes an occupant's knees to contact a fixed lower portion of the instrument panel which constitutes a knee bolster. This knee bolster can absorb impact energy imposed by the occupant's knees during a collision event. However, in vehicles that provide generous leg room, the instrument panel may be too far away from the occupant to absorb an occupant's impact energy.

Occupant protection systems often include one or more airbag cushions. Airbag cushions are typically disposed within a housing in a packaged state (e.g., rolled, folded, and/or otherwise compressed) and may be retained in the packaged state behind a cover. During a collision event, an inflator may be triggered, which rapidly fills an airbag cushion with inflation gas. The inflation gas may cause the airbag cushion to rapidly transition from a compact packaged (i.e., undeployed) state to an expanded or deployed state. In some embodiments, the expanding airbag cushion opens an airbag cover (e.g., by tearing through a tear seam or opening a door-like structure) to exit the housing. The inflator may be triggered by any suitable device or system, and the triggering may be in response to and/or influenced by one or more vehicle sensors.

Some occupant protection systems include a frontal airbag cushion that is configured to receive the head and/or torso of an occupant during a collision event. Some protection systems also include a knee restraint to protect the knees and/or lower leg of an occupant during a collision event. Such knee restraints may absorb the impact energy of an occupant, particularly during a frontal impact event. In some embodiments, a knee restraint includes a knee airbag cushion that contacts and cushions the knee during a collision event. In some embodiments, a knee restraint includes a knee bolster that absorbs the impact energy of an occupant during a collision event. Some knee bolsters disclosed herein are active knee bolsters that are capable of extending toward an occupant in anticipation of or in response to a collision event.

Figure 2:
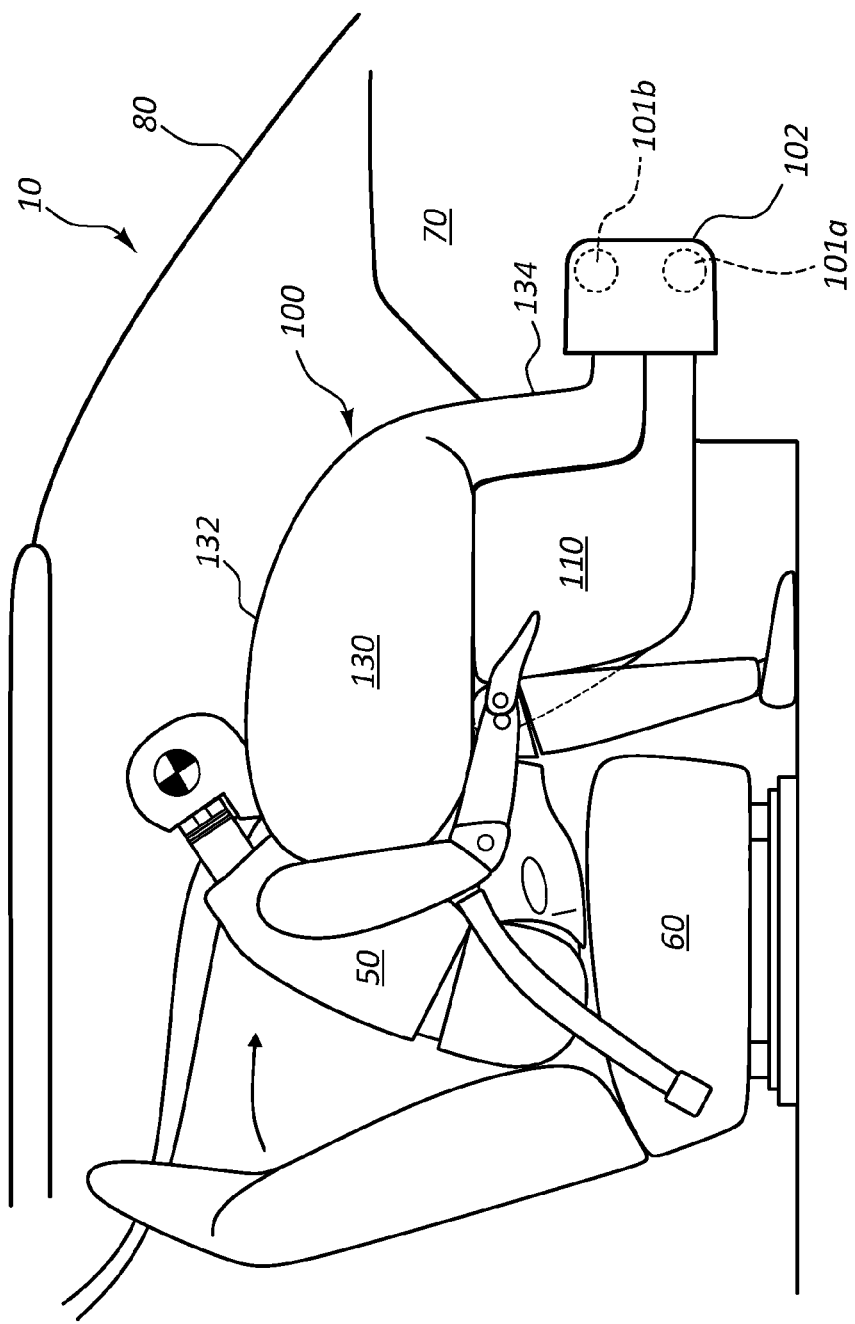
FIG. 2 is a side view of the airbag assembly of FIG. 1 in a deployed state.
Figure 3:
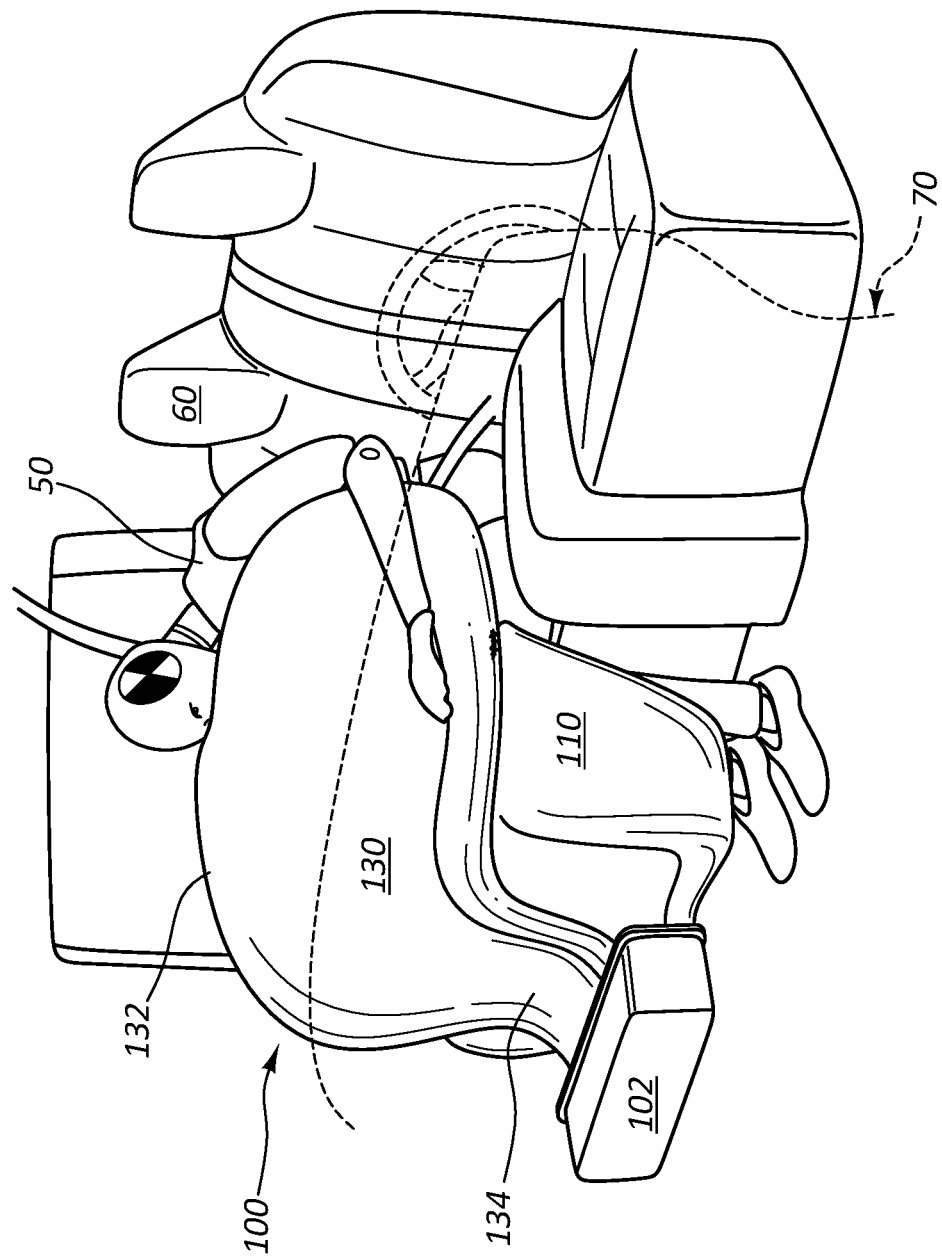
FIG. 3 is a perspective view of the airbag assembly of FIG. 1 in a deployed state.

FIGS. 1-3 depict an airbag assembly 100, according to one embodiment. More specifically, FIG. 1 illustrates a side view of the airbag assembly 100 within a vehicle 10 prior to deployment, while FIGS. 2 and 3 provide a side view and perspective view of the airbag assembly 100 in a deployed state.

As depicted in FIG. 1, the airbag assembly 100 includes an airbag housing 102 that is disposed and/or mounted within an instrument panel 70 forward of a vehicle occupant 50. In the depicted embodiment, the airbag housing 102 is disposed forward of an occupant 50 that is seated in a vehicle occupant position, within which the vehicle occupant 50 is generally positioned while in a seat 60 within the vehicle 10. In the depicted embodiment, the occupant 50 is seated in the seat 60 positioned within a passenger compartment of the vehicle 10 so as to provide generous leg room for the occupant 50. For example, in some embodiments, the distance ($d_1$) from the instrument panel 70 and the seat 60 in which the occupant 50 is seated is greater than or equal to 300, 350, 400, 500, 600, and/or 800 mm. In some embodiments, the distance ($d_2$) between the airbag housing 102 and the seat 60 in which the occupant 50 is seated is greater than or equal to 350, 400, 500, 600, and/or 800 mm.

As shown in FIGS. 2 and 3, the airbag assembly 100 includes, in addition to the airbag housing 102, a knee airbag cushion 110 as a knee restraint, and a frontal airbag cushion 130.

The knee airbag cushion 110 is configured to receive inflation gas from an inflator 101a and deploy rearward from the airbag housing 102 toward an occupant 50 to cushion one or more knees of the occupant 50 during a collision event. In some embodiments, the knee airbag cushion 110 extends a distance of greater than about 200, 250, and/or 300 mm from the airbag housing 102 to a region at which the knee airbag cushion 110 is disposed furthest from the airbag housing 102 when fully deployed.

The frontal airbag cushion 130 is configured to receive inflation gas from an inflator 101b and deploy rearward from the airbag housing 102 to cushion one or more of a torso and a head of an occupant 50 as the occupant 50 moves forward relative to the vehicle 10 during a collision event. As depicted in FIGS. 2 and 3, the frontal airbag cushion 130, when fully deployed, is disposed generally above the knee airbag cushion 110 and extends over the lap of the occupant 50. In some embodiments, the frontal airbag cushion 130, when fully deployed, is disposed in front of the occupant 50 and at a position lower than the head of a fiftieth percentile adult male crash test dummy when the crash test dummy is seated in the vehicle occupant position. Examples of fiftieth percentile male crash test dummies include the Hybrid III 50th Percentile Male Crash Test Dummy and the THOR Advanced Crash Test Dummy. In some embodiments, the frontal airbag cushion 130, when fully deployed, extends a distance of greater than about 1 m from the airbag housing 102 to a region at which the frontal airbag cushion 130 is disposed furthest from the airbag housing 102.

The frontal airbag cushion 130 and the knee airbag cushion 110 may be sized and shaped in any suitable manner. In some embodiments, the frontal airbag cushion 130 has a greater inflated volume than the knee airbag cushion 110. In other embodiments, the knee airbag cushion 110 has the same or a greater inflated volume than the frontal airbag cushion 130. In some embodiments, such as that depicted in FIGS. 2 and 3, the frontal airbag cushion 130 includes a pillow-shaped portion 132 for receiving one or more of the head or torso of an occupant 50, and a neck portion 134 that connects the pillow-shaped portion 132 to the airbag housing 102. More particularly, as shown in the depicted embodiment, the neck portion 134 may extend in a generally upward direction adjacent to a substantially vertical panel of the knee airbag cushion 110 to connect the pillow-shaped portion 132 of the frontal airbag cushion 130 to the airbag housing 102.

In some embodiments the frontal airbag cushion 130 shares at least a portion of a panel with the knee airbag cushion 110 to divide the frontal airbag cushion 130 from the knee airbag cushion 110. Described another way, in some embodiments, the frontal airbag cushion 130 and the knee airbag cushion 110 may be considered, in essence, a single, two-chambered airbag where the upper chamber and the lower chamber are separated by and/or share in common one or more panels. In other or further embodiments, a lower surface of the frontal airbag cushion 130 is attached to an upper surface of the knee airbag cushion 110. Such attachment may be via any suitable means. For example, the lower surface of the frontal airbag cushion 130 and the upper surface of the knee airbag cushion 110 may be attached to one another via stitching, adhesives, welding, or any other attachment mechanism.

With the frontal airbag cushion 130 and the knee airbag cushion 110 coupled to one another in this manner, the frontal airbag cushion 130 may restrain forward movement of the occupant 50 relative to the vehicle 10 during a collision event without relying on the instrument panel 70 or a windshield 80 as a reaction surface for stabilizing the frontal airbag cushion 130. Stated differently, the knee airbag cushion 110 may impede forward rotation or movement of the frontal airbag cushion 130 upon occupant 50 loading due to the attachment of the frontal airbag cushion 130 to the knee airbag cushion 110.

The airbag assembly 100 may be deployed to cushion an occupant 50 in connection with a collision event. For instance, during or in anticipation of a collision event, one or more vehicle sensors may be actuated, which trigger one or more inflators 101*a*, 101*b* that cause deployment of the knee airbag cushion 110 and the frontal airbag cushion 130 from the airbag housing 102. More specifically, in the embodiment depicted in FIG. 1, the knee airbag cushion inflator 101*a* and the frontal airbag cushion inflator 101*b* fill the corresponding airbag cushions 110, 130 with inflation gas, causing the airbag cushions 110, 130 to expand and emerge from the housing 102. In other embodiments, the frontal airbag cushion and the knee airbag cushion are inflated by the same inflator. This inflator may be a single-stage inflator or a two-stage inflator. In some embodiments, the knee airbag cushion 110 and the frontal airbag cushion 130 deploy essentially simultaneously. In other embodiments, either the knee airbag cushion 110 or the frontal airbag cushion 130 deploy prior to the other.

The knee airbag cushion 110 may contact and cushion one or more knees of an occupant 50, thereby pinning the knees and/or lower leg of the occupant 50 adjacent to the seat 60. Such contact, together with the forces on the occupant 50 generated by the collision event, may cause the occupant 50 to double over onto the frontal airbag cushion 130 in collision events that cause the occupant 50 to move in a forward direction relative to the vehicle 10. The frontal airbag cushion 130 may thus restrain the forward movement of the occupant 50 relative to the vehicle 10. Additionally, the knee airbag cushion 110, due to its attachment to the frontal airbag cushion 130, may restrict the forward movement of the frontal airbag cushion 130 upon occupant 50 loading.

Figure 4:
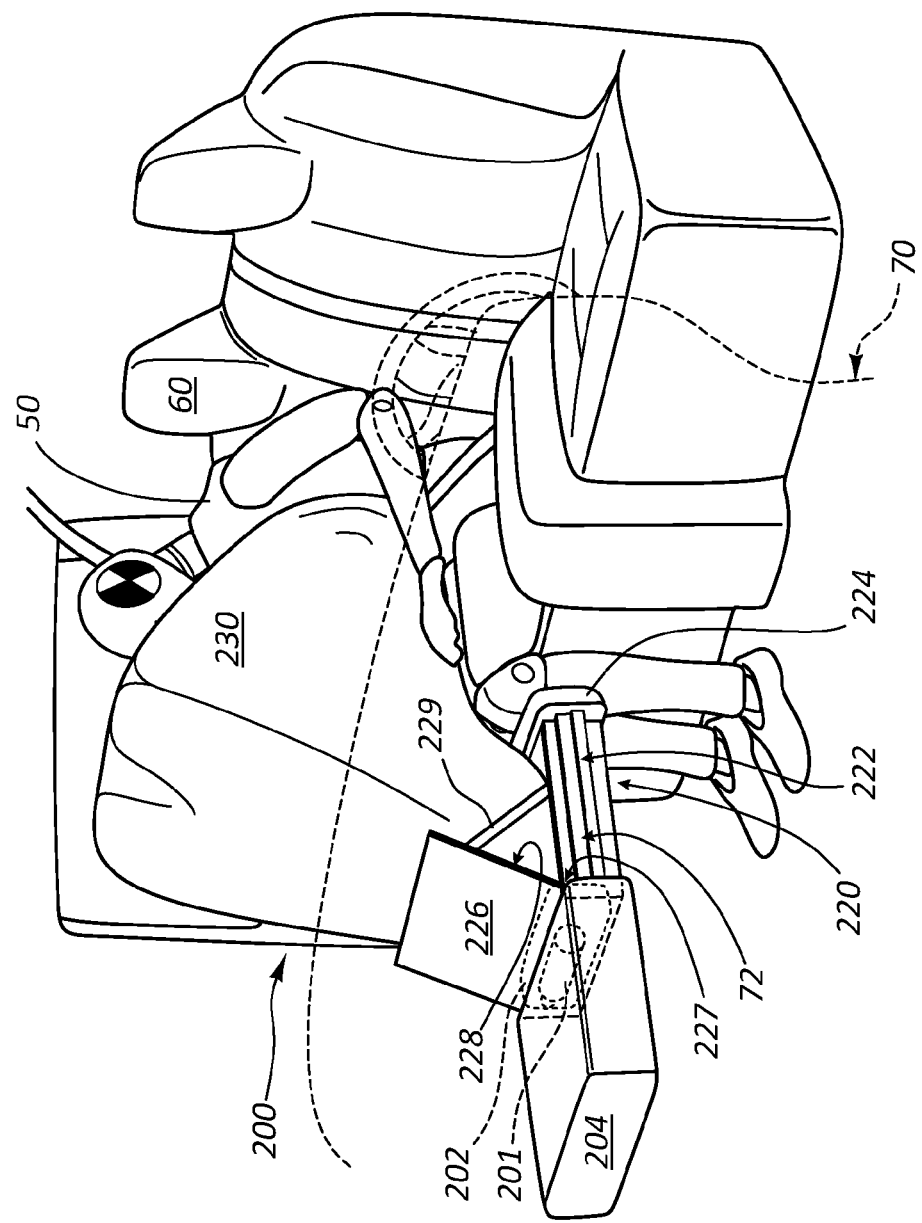
FIG. 4 is a perspective view of an airbag assembly, according to another embodiment.

FIG. 4 provides a side view of an airbag assembly 200 that resembles the airbag assembly 100 described above in certain respects. Accordingly, like features are designated with like reference numerals, with the leading digits incremented to "2." For example, the embodiment depicted in FIG. 4 includes a frontal airbag cushion 230 that may, in some respects, resemble the frontal airbag cushion 130 of the airbag assembly 100 depicted in FIGS. 1-3. Relevant disclosure set forth above regarding similarly identified features thus may not be repeated hereafter. Moreover, specific features of airbag assemblies and related components shown in FIGS. 1-3 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 200 and related components depicted in FIG. 4. Any suitable combination of the features, and variations of the same, described with respect to the airbag assembly 100 and related components illustrated in FIGS. 1-3 can be employed with the airbag assembly 200 and related components of FIG. 4, and vice versa. This pattern of disclosure applies equally to further embodiments depicted in subsequent figures and described hereafter, wherein the leading digits may be further incremented.

The airbag assembly 200 depicted in FIG. 4 includes a knee bolster housing 204, a knee bolster 220, and a frontal airbag cushion 230. In the depicted embodiment, the knee bolster housing 204 is disposed and mounted forward of a vehicle occupant 50 and within an instrument panel 70 of the vehicle.

In the depicted embodiment, the knee bolster housing 204 is disposed within the instrument panel 70 and is both sized and configured to house a knee bolster 220. The seat 60 may be positioned relative to other vehicle 10 components, such as the instrument panel 70, to provide generous leg room to an occupant 50, similar to that described above in connection with the airbag assembly 100.

The knee bolster 220 includes a main body 222 and a knee pad 224 disposed at an occupant side of the main body 222 to cushion one or more knees of an occupant 50 during a collision event. In the depicted embodiment, the knee bolster 220 is configured to operate as an active knee bolster that extends toward the occupant 50 during a collision event to absorb impact energy of the occupant 50. For instance, in some embodiments, the knee bolster 220 is configured to extend from the instrument panel 70 to a distance from a seat 60 that approximates the distance between a seat and an instrument panel in vehicles with "normal" leg room. Stated differently, in some embodiments, when the knee bolster 220 is fully deployed, the knee bolster 220 is disposed from about 200 mm to about 300 mm from a seat 60 in which the occupant 50 is seated.

As illustrated in FIG. 4, the knee bolster 220 is configured to deploy from the knee bolster housing 204 of the instrument panel 70 on a set of rails 72 in a drawer-like fashion. For instance, in some embodiments, a pyrotechnic device may drive a piston that is configured to push a knee bolster (e.g., knee bolster 220) along the rails 72 toward the occupant 50 in response to or in anticipation of a collision event. Knee bolsters may be deployed in other ways as well. For example, in some embodiments, the knee bolster is actuated by a motorized device or a hydraulic device in lieu of or in combination with a pyrotechnic device. In still other embodiments, the knee bolster 220 may be deployed via an expanding metal knee bolster.

In some embodiments, a knee bolster 220 may also be retracted after deployment. For example, in some embodiments, a knee bolster is deployed by a motorized or hydraulic device in anticipation of a collision event. After the collision event has occurred or the threat of the collision has passed, the knee bolster may be retracted by the motorized or hydraulic device. One of ordinary skill in the art, with the benefit of this disclosure, will recognize that other suitable mechanisms may be used to extend and/or retract a knee bolster 220 from an instrument panel 70 toward one or more knees of an occupant 50.

The knee bolster 220 may include an airbag housing 202 from which a frontal airbag cushion 230 may be deployed. The frontal airbag cushion 230 is configured to receive inflation gas from an inflator 201 and deploy generally rearward from the airbag housing 202 to cushion one or more of a torso or a head of an occupant 50 during a collision event. Thus, when the airbag assembly 200 is deployed during a collision event, the impact energy of the occupant 50 may be absorbed by both the knee bolster 220 and the frontal airbag cushion 230 which emerges from the knee bolster 220. In the depicted embodiment of FIG. 4, the airbag housing 202 for the frontal airbag cushion 230 is disposed within the knee bolster 220 to deploy from an upper surface of the knee bolster 220, forward of the knee pad 224. When inflated, the frontal airbag cushion 230 may extend above and over the knee pad 224 and may extend over a lap of the occupant 50.

In some embodiments, the frontal airbag cushion 230 may begin deploying from the airbag housing 202 when the knee bolster 220 is partially or fully deployed. Stated differently, the knee bolster 220 may exit or begin exiting from an instrument panel 70 toward the occupant 50 before the frontal airbag cushion 230 begins to inflate.

Because such serial deployment can be time-consuming, the knee bolster 220, in some embodiments, deploys prior to and in anticipation of a collision event (e.g., in response to sharp braking, or when an object is detected in a path of travel of the vehicle). When and if an actual collision is detected, the frontal airbag cushion 230 may be deployed from the already deployed knee bolster 220. In other embodiments, the knee bolster 220 does not deploy prior to the collision event, but deploys from an instrument panel 70 toward one or more knees of an occupant 50 only in response to the collision event.

In the depicted embodiment, the frontal airbag cushion 220 is disposed in a packaged state within the main body 222 of the knee bolster 220 prior to deployment. Upon deployment, the frontal airbag cushion 230 deploys from the main body 222 and emerges from a top portion or upper surface of the knee bolster 220 to extend toward the head and/or torso of an occupant 50.

In the depicted embodiment, the knee bolster 220 of the airbag assembly 200 further includes an impact support member 226 that is configured to deploy in response to a collision event. The impact support member 226 includes a reaction surface 228 for contacting the frontal airbag cushion 230 when the frontal airbag cushion 230 is inflated to direct the frontal airbag cushion 230 toward the occupant 50.

More particularly, in the depicted embodiment, the knee bolster 220 includes a lid that functions as an impact support member 226 to contact the frontal airbag cushion 230. For instance, upon deployment of the frontal airbag cushion 230, the impact support member 226 may rotate about a hinge 227 to allow the frontal airbag cushion 230 to emerge from the knee bolster 220. The movement and rotation of the impact support member 226 about the hinge 227 may be limited by a tether 229 or similar limiting device that couples (e.g., attaches) the impact support member 226 to the main body of the knee bolster 220. In other words, when the tether 229 is drawn taut, the impact support member 226 ceases to rotate and the inner surface of the impact support member 226 functions as a reaction surface 228 for contacting the frontal airbag cushion 230 and directing the frontal airbag cushion 230 toward the occupant 50. The reaction surface 228 of the impact support member 226 may also impede the rotation or other movement of the frontal airbag cushion 230 in a forward direction upon occupant 50 loading. In other embodiments, the impact support member is coupled to and controlled by a four-bar linkage system.

Figure 5:
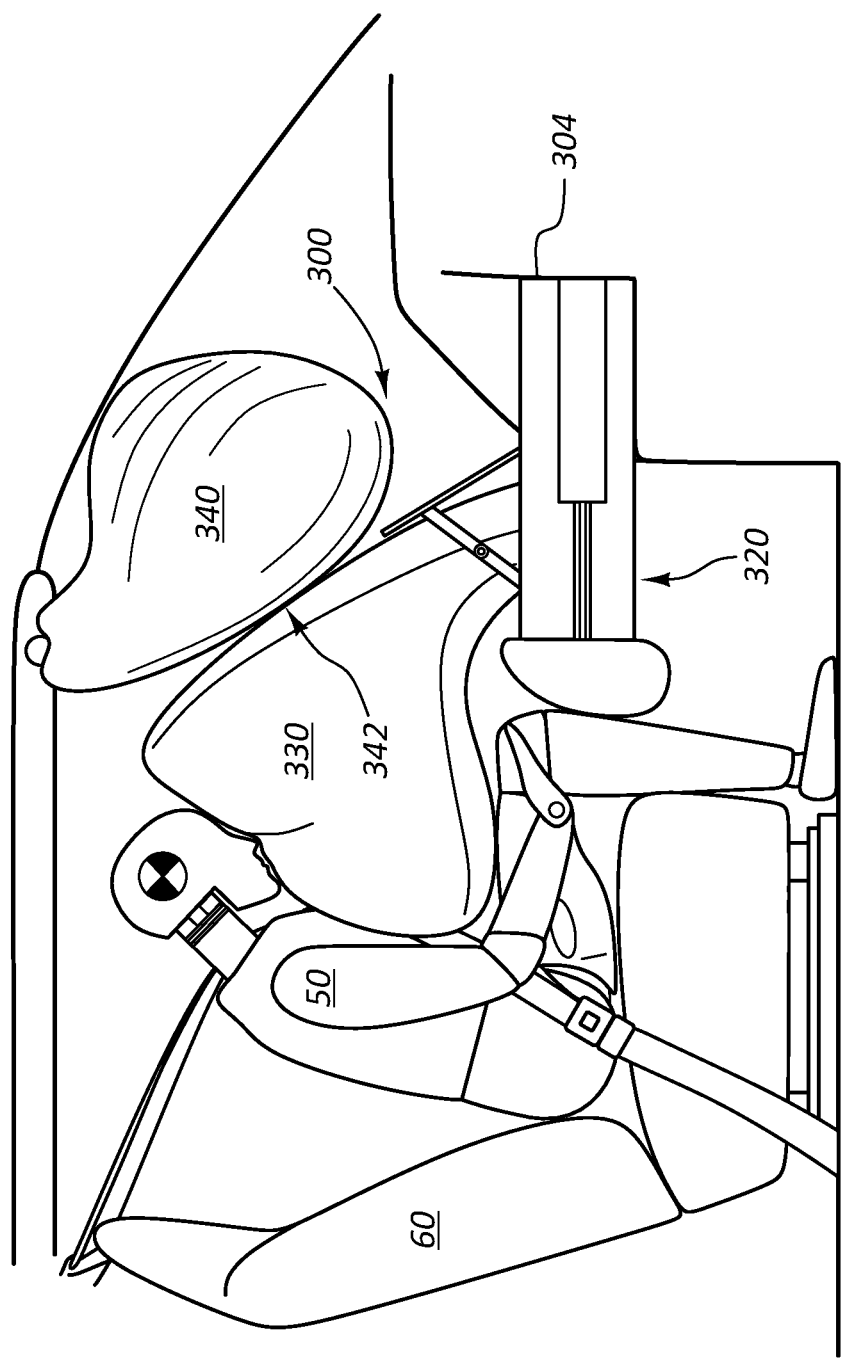
FIG. 5 is a side view of an airbag assembly, according to another embodiment.

FIG. 5 is a side view of an airbag assembly 300. The airbag assembly 300 includes a knee bolster housing 304, a knee bolster 320, a frontal airbag cushion 330 and a roof-mounted airbag 340.

The airbag assembly 300 is generally analogous to the airbag assembly 200 described above in connection with FIG. 4. However, in contrast to the airbag assembly 200 of FIG. 4, the impact support member of the airbag assembly 300 includes a roof-mounted airbag 340. The roof-mounted airbag 340 is configured to deploy in a generally downward direction in anticipation of or response to a collision event to provide a reaction surface 342 for the frontal airbag cushion 330. The reaction surface 342 provided by the roof-mounted airbag 340 directs the frontal airbag cushion 330 toward the occupant 50 and restricts the forward rotation and movement of the frontal airbag cushion 330 upon occupant 50 loading. A windshield of the vehicle may provide a reaction surface for the roof-mounted airbag 340.

Figure 6:
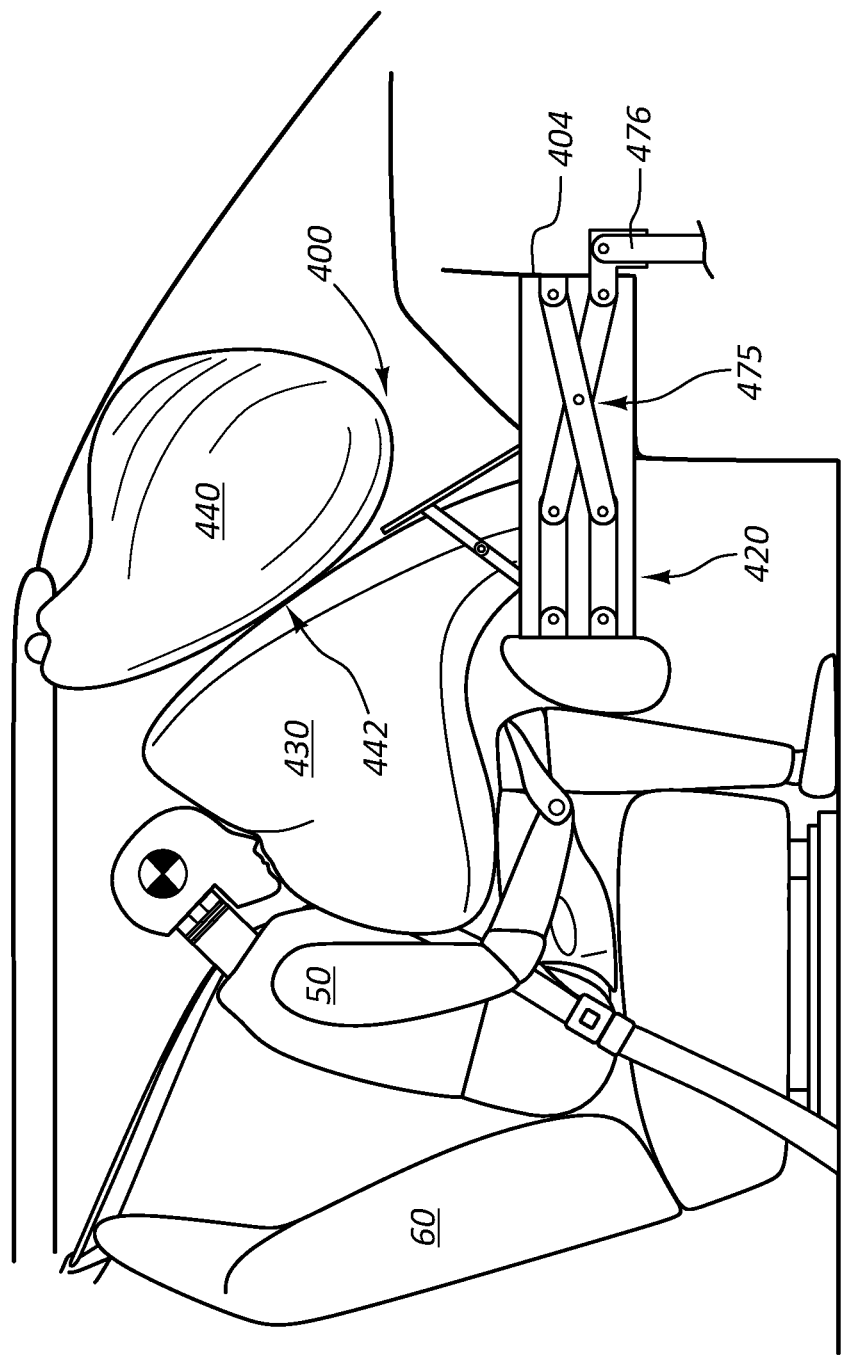
FIG. 6 is a side view of an airbag assembly, according to another embodiment.

FIG. 6 depicts an airbag assembly 400 for receiving an occupant 50 that resembles the airbag assembly 300 in some respects. The airbag assembly 400 includes a knee bolster 420, a frontal airbag cushion 430 configured to deploy from the knee bolster 420, and a roof-mounted airbag 440 that provides a reaction surface 442 for the frontal airbag cushion 430.

In contrast with the airbag assembly 300, the airbag assembly 400 is deployed via a four-bar linkage system 475 to extend the knee bolster 420 toward the occupant 50. For example, upon deployment, an input apparatus 476 may provide input for the four-bar linkage system 475, thereby causing the four-bar linkage 475 (and knee bolster 420) to extend toward the occupant 50. The input apparatus 476 may include a pyrotechnic device, a motorized device, a hydraulic device, and/or some other input mechanism. For example, in some embodiments, the input apparatus 476 includes a motorized leadscrew that is displaced (e.g., moved upward) to cause deployment of the knee bolster 420. Four-bar linkage systems 475 that are driven by a motorized and/or hydraulic device may, in some circumstances, be extended more slowly than a system that is driven by a pyrotechnic.

In some circumstances and/or embodiments, the knee bolster 420 may be retracted after deployment. For example, the knee bolster 420 may be deployed by a motorized leadscrew or some other input apparatus 476 in anticipation of a collision event. After the collision has occurred or the threat of collision has passed, the knee bolster 420 may be retracted as the motorized leadscrew is rotated in a direction that is opposite of the direction in which the leadscrew rotated to deploy the knee bolster 420. One of ordinary skill in the art, with the benefit of this disclosure, will recognize that, in addition to the mechanisms for knee bolster deployment specifically described herein, other suitable mechanisms may be used to extend and/or retract a knee bolster.

Figure 7:
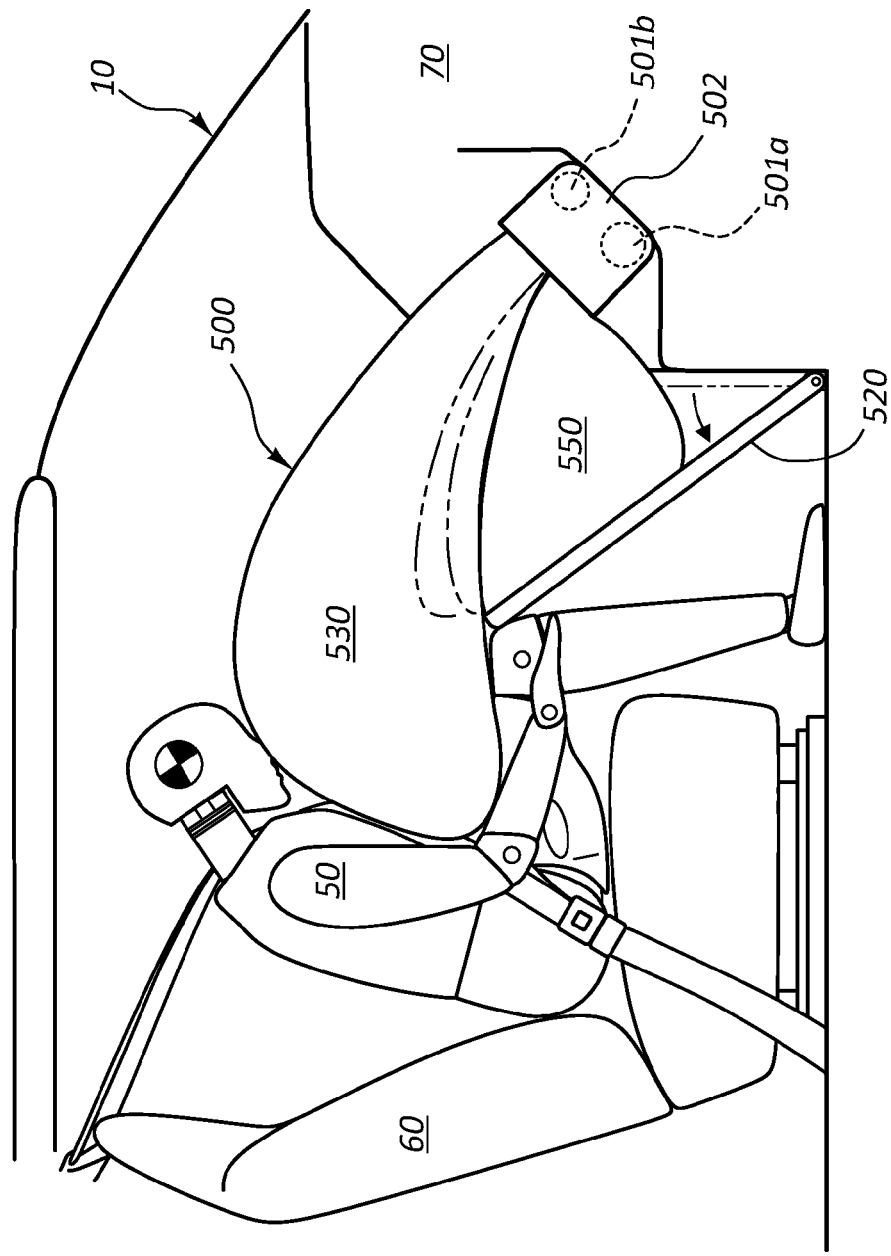
FIG. 7 is a side view of an airbag assembly, according to another embodiment.

FIG. 7 is a side view of an airbag assembly 500, according to another embodiment. The airbag assembly 500 includes an airbag housing 502, a frontal airbag cushion 530, a knee-bolster deploying airbag cushion 550, and a knee bolster 520. The frontal airbag cushion 530, the knee bolster 520, and the knee-bolster deploying airbag cushion 550 are configured to receive an occupant 50 during a collision event, thereby dissipating the impact energy of the occupant 50. In the depicted embodiment, the airbag housing 502 is disposed and mounted forward of a vehicle occupant 50 and within an instrument panel 70 of the vehicle 10.

The seat 60 may be positioned relative to other vehicle 10 components, such as the instrument panel 70, to provide generous leg room to an occupant 50, similar to that described above in connection with the airbag assembly 100.

The frontal airbag cushion 530 is configured to transition from an undeployed state to a deployed state by receiving inflation gas from an inflator 501b to receive one or more of a head and torso of an occupant 50 during a collision event. Stated differently, the frontal airbag cushion 530 may be configured to receive one or more of a head and torso of a vehicle occupant 50 during a collision event in which the occupant 50 moves in a generally forward direction. When fully inflated, the frontal airbag cushion 530 may be configured to extend over a lap of the occupant 50.

The knee bolster 520 and knee-bolster deploying airbag cushion 550 are disposed generally below the frontal airbag cushion 530. The knee bolster 520 and knee-bolster deploying airbag cushion 550 are configured to deploy away from the airbag housing 502 and extend rearward toward an occupant 50 of the vehicle compartment to cushion one or more knees of the occupant 50 during a collision event.

For example, upon deployment, the knee-bolster deploying airbag cushion 550 may fill with inflation gas from an inflator 501a to push the knee bolster 520 from an instrument panel 70 toward one or more knees of the occupant 50. More particularly, in the depicted embodiment, the knee bolster 520 includes a first end that is hingedly coupled to the floor or instrument panel 70 and a second end that swings toward the occupant 50 during a collision event. Stated differently, the knee-bolster deploying airbag cushion 550 may cause rotation of the knee bolster 520 about a hinge to advance an end of the knee bolster 520 toward the one or more knees of the occupant 50.

In some embodiments the frontal airbag cushion 530 shares at least a portion of a panel with the knee-bolster deploying airbag cushion 550 to divide the frontal airbag cushion 530 from the knee-bolster deploying airbag cushion 550. Stated differently, in some embodiments, the frontal airbag cushion 530 and the knee bolster-deploying airbag cushion 550 constitute, in essence, a single, two-chambered airbag where the upper chamber is separated from the lower chamber by one or more panels. In other or further embodiments, the lower surface of the frontal airbag cushion 530 is attached to an upper surface of the knee-bolster deploying airbag cushion 550. Attachment of the frontal airbag cushion 530 to the knee bolster deploying airbag cushion 550 in one of these manners may restrict the forward movement or rotation of the frontal airbag cushion 530 during occupant 50 loading. In other embodiments, the frontal airbag cushion 530 and the knee bolster-deploying airbag cushion 550 are not attached to one another.

In some embodiments, the airbag assembly 500 is designed such that the knee bolster 520 deploys toward one or more knees of an occupant 50 prior to and in anticipation of a collision event. In other embodiments, the knee bolster 520 deploys only in response to a collision event.

In some embodiments (not shown), the airbag assembly 500 may further include an impact support structure, analogous to the roof-mounted airbag cushions 340, 440 depicted in FIGS. 5 and 6, respectively.

Figure 8:
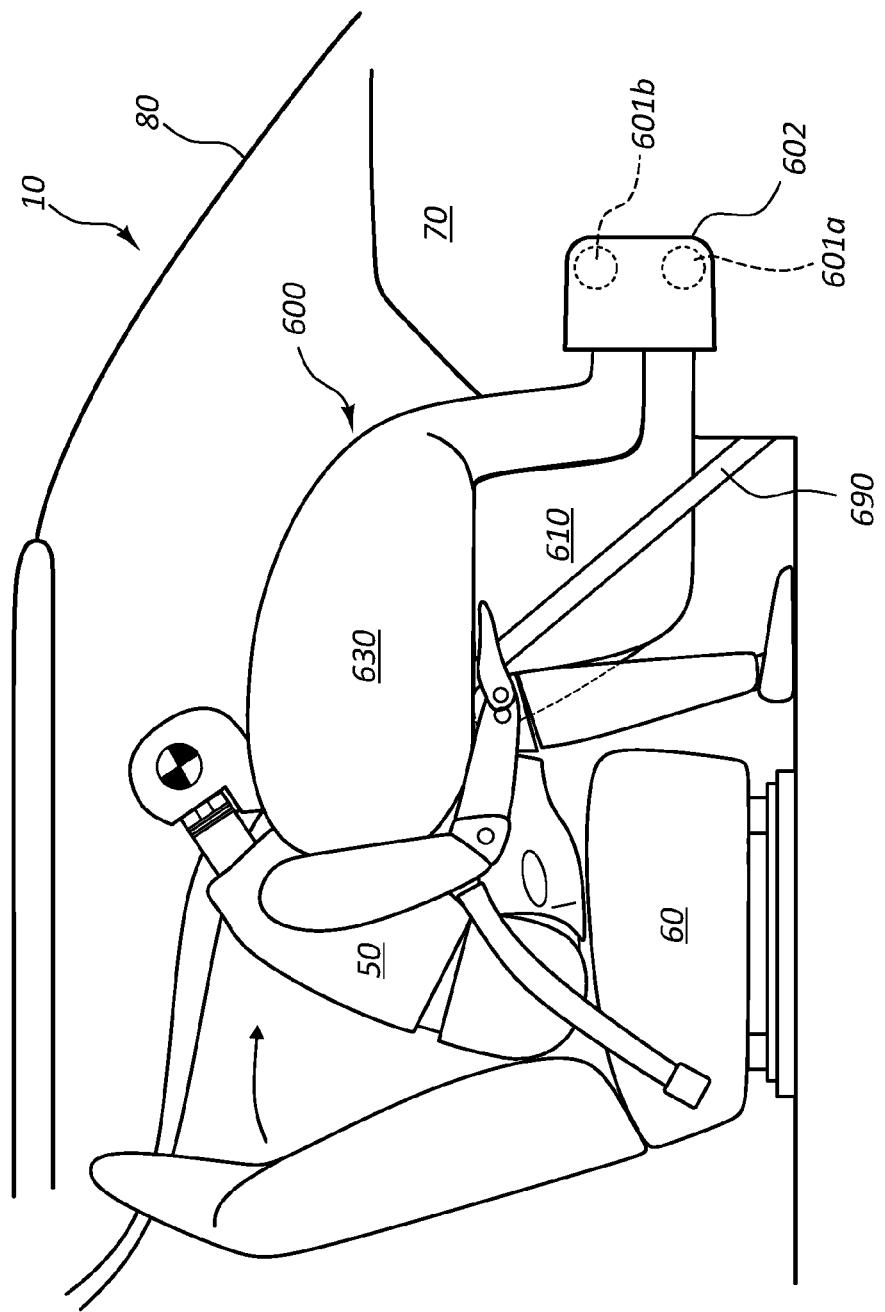
FIG. 8 is a side view of an airbag assembly, according to another embodiment.

FIG. 8 provides a side view of a deployed airbag assembly 600, according to another embodiment. The airbag assembly 600 includes an airbag housing 602, a knee airbag cushion 610 as a knee restraint, a frontal airbag cushion 630, and one or more tethers 690.

The airbag housing 602 is disposed generally forward of the occupant 50 when the occupant 50 is seated in the vehicle occupant position. In anticipation of or response to a collision event, the knee airbag cushion 610 and the frontal airbag cushion 630 emerge from the airbag housing 602 to absorb impact energy from the occupant 50. More particularly, the knee airbag cushion 610 may receive inflation gas from an inflator 601a and deploy rearward from the airbag housing 602 toward an occupant 50 to cushion one or more knees of the occupant 50 during a collision event. The frontal airbag cushion 630 may also receive inflation gas from an inflator 601b and deploy rearward from the airbag housing 602 to cushion one or more of a torso and a head of an occupant 50 as the occupant 50 moves forward relative to the vehicle 10 during the collision event.

In the embodiment depicted in FIG. 8, the frontal airbag cushion 630 is not attached to the knee airbag cushion 610, thereby allowing the frontal airbag cushion 630 to move independent of the knee airbag cushion 610. In other embodiments, the knee airbag cushion is attached to the frontal airbag cushion as described above in connection with the airbag assembly 100 (e.g., via a shared panel, stitching, adhesives, welding, etc.).

In the depicted embodiment, the airbag assembly 600 includes one or more tethers 690 that restrict forward rotation of the frontal airbag cushion 630 (e.g., rotation toward the windshield 80 of a vehicle 10) during occupant 50 loading. The one or more tethers 690 may be attached to any suitable structure of the vehicle 10 to limit the forward rotation of the frontal airbag cushion 630. In the depicted embodiment, the tether 690 includes a first end that is attached to the frontal airbag cushion 630. The tether 690 also includes a second end that is attached to the dashboard 70 adjacent the floor of the vehicle 10. In other embodiments, tether 690 may extend through one or more airbag cushions, with the second end of the tether attached to an airbag housing. The tether 690 restricts the upward movement of the airbag cushion 630, thereby limiting forward rotation of the airbag cushion 630 upon occupant loading. More particularly, the tether 690 restricts upward rotational movement of the airbag cushion 630 about the housing as a rotational axis.

In other embodiments in which the knee airbag cushion is attached to the frontal airbag cushion, the tether may be attached to the knee airbag cushion instead of the frontal airbag cushion. Upon occupant loading, such a tether restricts the upward movement of the knee airbag cushion, which in turn restricts the upward movement of the frontal airbag cushion due to the attachment of the knee airbag cushion to the frontal airbag cushion.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure. The scope of the present invention should, therefore, be determined only by the following claims.

We claim:

1. An airbag assembly comprising:
   a housing to be mounted in a vehicle;
   a knee airbag cushion to deploy from the housing to cushion one or more knees of an occupant during a collision event of the vehicle; and
   a frontal airbag cushion to deploy from the housing to cushion one or more of a torso and a head of the occupant during the collision event;
   wherein the frontal airbag cushion is attached to the knee airbag cushion to restrict forward movement of the frontal airbag cushion during occupant loading; and
   wherein the frontal airbag cushion does not use an instrument panel or a windshield as a reaction surface.

2. The airbag assembly of claim 1, wherein the knee airbag cushion is configured to, upon deployment, contact the one or more knees of the occupant, thereby causing the occupant to double over onto the frontal airbag cushion if the occupant is moving in a forward direction relative to the vehicle due to the collision event.

3. The airbag assembly of claim 1, wherein the frontal airbag cushion is configured to restrain forward movement of the occupant relative to the vehicle during the collision event absent a reaction surface.

4. The airbag assembly of claim 1, wherein the frontal airbag cushion, when fully deployed, is disposed in front of the occupant and at a position lower than a head of a fiftieth percentile adult male crash test dummy when the crash test dummy is seated in the vehicle occupant position.

5. The airbag assembly of claim 1, wherein the frontal airbag cushion is configured to extend over the lap of the occupant when fully deployed.

6. The airbag assembly of claim 1, further comprising a tether that is coupled between a component of the vehicle and the knee airbag cushion to limit movement of the knee airbag cushion, thereby limiting movement of the frontal airbag cushion relative to the vehicle upon occupant impact.

7. The airbag assembly of claim 1, further comprising a tether that is coupled to the both the frontal airbag cushion and to a component of a vehicle to secure the frontal airbag cushion relative to the vehicle, thereby restricting movement of the frontal airbag cushion relative to the vehicle during occupant loading.

8. The airbag assembly of claim 1, wherein the distance between the housing and a seat in which the occupant is seated is greater than or equal to 350 mm.

9. The airbag assembly of claim 1, wherein the frontal airbag cushion comprises a pillow-shaped portion to receive the one or more of the torso and the head of the occupant.

10. The airbag cushion of claim 1, wherein the frontal airbag cushion has a greater inflated volume than the knee airbag cushion.

11. The airbag assembly of claim 7, wherein a first end of the tether is attached to the frontal airbag cushion and a second end of the tether is attached to one or more of the instrument panel, a frame, and a floor of the vehicle.

12. The airbag assembly of claim 1, further comprising a first inflator for delivering inflation gas to the frontal airbag cushion and a second inflator for delivering inflation gas to the knee airbag cushion.

13. The airbag assembly of claim 1, wherein the housing is configured to be mounted such that a distance between the housing and a seat in which the occupant is seated is greater than or equal to 400 mm.

14. An airbag assembly comprising:
   a housing configured to be mounted forward of a vehicle occupant;
   a knee restraint that is configured to deploy away from the housing to extend rearward toward an occupant of the vehicle compartment to cushion one or more knees of the occupant during a collision event;
   a frontal airbag cushion that is configured to
      deploy from one or more of the housing and the knee restraint; and
      receive inflation gas from an inflator to cushion one or more of a torso and
   a head of the occupant during the collision event;
   wherein the frontal airbag cushion is attached to the knee restraint and the knee restraint restricts forward movement of the frontal airbag cushion during occupant loading;
   wherein the frontal airbag cushion does not use an instrument panel or a windshield as a reaction surface.

15. The airbag assembly of claim 14, wherein the knee restraint comprises a knee airbag cushion, wherein:
   the frontal airbag cushion shares at least a portion of a panel with the knee airbag cushion to divide the frontal airbag cushion from the knee airbag cushion; or
   a lower surface of the frontal airbag cushion is attached to an upper surface of the knee airbag cushion.

16. The airbag assembly of claim 14, wherein the knee restraint comprises a knee bolster that rotates about a hinge to advance an end of the knee bolster toward the one or more knees of the occupant during the collision event.

17. The airbag assembly of claim 14, wherein the knee restraint comprises a knee bolster, the knee bolster comprising:
   a main body that is configured to deploy toward the occupant, wherein the frontal airbag cushion is disposed in a packaged state within the main body and is configured to deploy from the main body; and
   a knee pad disposed at an occupant side of the main body to cushion the one or more knees of the occupant.

18. The airbag assembly of claim 14, wherein the housing is configured to be mounted such that a distance between the housing and a seat in which the occupant is seated is greater than or equal to 350 mm.

19. The airbag assembly of claim 14, wherein the knee restraint is configured to deploy prior to and in anticipation of the collision event.

20. The airbag assembly of claim 14, wherein the frontal airbag cushion extends over the lap of the occupant when inflated.

* * * * *